(12) United States Patent
Suzuki (10) Patent No.: US 7,671,711 B2
(45) Date of Patent: Mar. 2, 2010

(54) LINEAR ACTUATOR FOR CIRCUIT BREAKER REMOTE OPERATION DEVICE

(75) Inventor: Kenji Suzuki, Kounosu (JP)

(73) Assignee: Fuji Electric FA Components & Systems Co., Ltd. (JP)

(*) Notice: Subject to any disclaimer, the term of this patent is extended or adjusted under 35 U.S.C. 154(b) by 166 days.

(21) Appl. No.: 11/926,363

(22) Filed: Oct. 29, 2007

(65) Prior Publication Data

US 2008/0128251 A1     Jun. 5, 2008

(30) Foreign Application Priority Data

Oct. 31, 2006   (JP) ............................. 2006-296067

(51) Int. Cl.
   *H01H 75/00*   (2006.01)
   *H01H 3/00*    (2006.01)
(52) U.S. Cl. ..................... 335/6; 335/68; 335/185; 335/186; 200/330; 200/331
(58) Field of Classification Search ............... 335/6, 335/11, 13, 14, 17, 68, 71, 75, 185, 186; 200/330, 331
See application file for complete search history.

(56) References Cited

U.S. PATENT DOCUMENTS 5,952,744 A * 9/1999 Chitayat ................. 310/12.31
6,066,998 A * 5/2000 Trumper et al. ............. 335/229
6,326,870 B1 * 12/2001 Larranaga et al. ............. 335/68
7,154,198 B2 * 12/2006 Kawai ..................... 310/12.15

FOREIGN PATENT DOCUMENTS

JP   2002-319504 A   10/2002
JP   2006-040665 A   2/2006

* cited by examiner

*Primary Examiner*—Ramon M Barrera
(74) *Attorney, Agent, or Firm*—Rossi, Kimms & McDowell LLP (57) ABSTRACT

A remote operation includes an electromagnetic linear actuator that has a moving part linked to a handle of a circuit breaker, and drives the handle according to a remote operation command to perform change-over operations on the handle to ON, OFF, and RESET positions. The electromagnetic linear actuator is composed of permanent magnet type linear pulse motors each including a field section having a plurality of permanent magnets arranged in a row and a coil section having a three-leg type magnetic yoke and actuation coils wound around the legs of the magnetic yoke and opposing the field section. Electric current in the actuation coils is controlled by sequentially changing-over excitation patterns during the operation process, and the moving part is driven in a stepwise motion to drive the handle of the circuit breaker to the end position of the changeover operation process.

16 Claims, 10 Drawing Sheets

(a) Coil 1

(b) Coil 2

(c) Coil 3

Fig. 4

Fig. 5 a (#1): −coil1 +coil2       b (#2): +coil2 −coil3 c (#3): +coil1 −coil3       d (#4): +coil1 −coil2 e (#5): −coil2 +coil3       f (#6): −coil1 +coil3 g: unexcited state of the coils

|     | 16a | 16b | 16c |
| --- | --- | --- | --- |
| # 1 | S | N | - |
| # 2 | - | N | S |
| # 3 | N | - | S |
| # 4 | N | S | - |
| # 5 | - | S | N |
| # 6 | S | - | N |

LINEAR ACTUATOR FOR CIRCUIT BREAKER REMOTE OPERATION DEVICE

CROSS-REFERENCE TO RELATED APPLICATION

This application is based on, and claims priority from, Japanese Patent Application No. 2006-296067, filed on Oct. 31, 2006, the contents of which are incorporated herein by reference.

BACKGROUND

The present invention relates in general to a linear actuator. More specifically, the invention relates to a linear actuator that can be incorporated into a remote operation device that is mounted on a circuit breaker, such as a molded case circuit breaker or an earth leakage circuit breaker, wherein the linear actuator drives the handle of the circuit breaker to ON, OFF, and RESET positions by remote control operation.

Circuit breakers are used as components in low voltage distribution systems, are installed on switch boards or control boards, and constitute s of a centralized control system. When a circuit breaker is used in combination with a remote operation device, an external accessory device is provided that changes over the handle of the circuit breaker between ON, OFF, and RESET positions according to an external command (an electric signal). In addition to the traditional motor-driven system consisting of a drive motor, reduction gears, and a feed screw, a type of remote operation device is known and commercially available at present in which an electromagnetic linear actuator directly drives the operation handle. Examples of electromagnetic linear actuators are shown, for example, in Japanese Unexamined Patent Application Publication No. 2002-319504 (FIG. 1 and FIG. 6) and Japanese Unexamined Patent Application Publication No. 2006-40665 (FIG. 3).

The construction of a remote operation device for a circuit breaker and a circuit breaker used in combination with the remote operation device that are disclosed in the above-referenced patent applications will now be described with reference to FIGS. 6(a), 6(b), 6(c), 7, and 8.

In FIGS. 6(a), 6(b), and 6(c), the symbol 1 designates a circuit breaker (a molded case circuit breaker), the symbol 1a designates a rocker type open and close operation handle projecting outward and upwards from a cover of the case 1b of the breaker, and the symbol 2 designates a remote operation device mounted on the top of the circuit breaker 1 and linked to the handle 1a. The remote operation device 2 is equipped with an electromagnetic linear actuator in a case 3. The linear actuator is composed of a guide rail 4, a moving part 5 guided and supported by the guide rail 4 (details of the moving part will be described later), and a pair of stationary parts disposed at both sides of the moving path of the moving part, each stationary part consisting of an E-shaped magnetic yoke 6a and an actuation coil 6b wound around the yoke 6a. In the arrangement where the remote operation device 2 is mounted on the circuit breaker 1, the operation handle 1a of the circuit breaker is engaged and linked with a recess structure formed on the bottom surface of the moving part 5. The reference numeral 7 designates a handle for manual operation provided on the moving part 5, and the reference numeral 8 designates an auxiliary cover provided on the top surface of the case 3.

Figure 7:
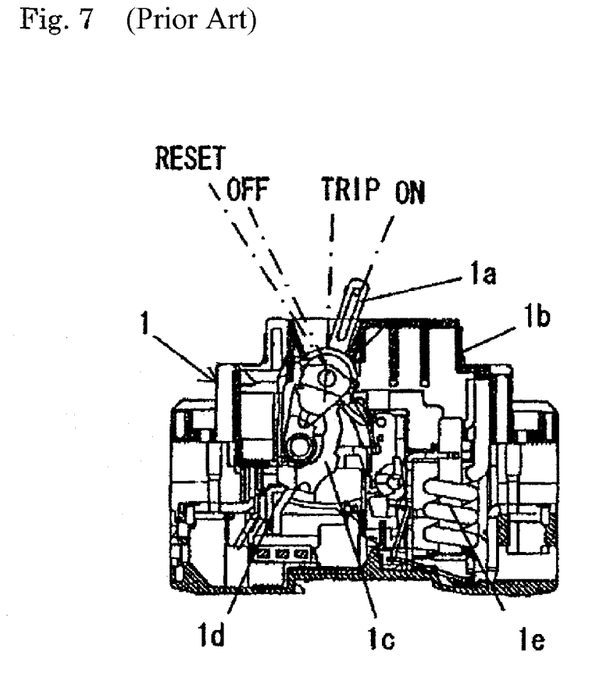
FIG. 7 shows an internal structure of the circuit breaker in FIGS. 6(a), 6(b), and 6(c)

As shown in FIG. 7, the handle 1a of the circuit breaker 1 links to a movable contact of a main circuit contact structure 1d through a switching mechanism 1c assembling a toggle linkage and a toggle spring. The switching mechanism 1c links to an overcurrent trip device 1e through a latch mechanism. When the circuit breaker is used alone and the handle 1a is moved from OFF position to ON position or ON position to OFF position indicated in FIG. 7, the switching mechanism 1c makes a reversing motion according to the movement of the handle 1a (the toggle linkage is urged by the toggle spring), to close or open the main circuit contact. When the overcurrent trip device 1e detects overcurrent in the main circuit and releases the latch mechanism, the circuit breaker trips to open the main circuit contact and the handle 1a stops at a TRIP position in the middle between ON and OFF positions on account of a condition of balance between the toggle linkage and the toggle spring, indicating trip action. To turn on the main circuit contact again after the trip action, the handle 1a is once again moved from TRIP position to RESET position to reset the latch mechanism, and then moved to ON position to close the main circuit contact.

Figure 8:
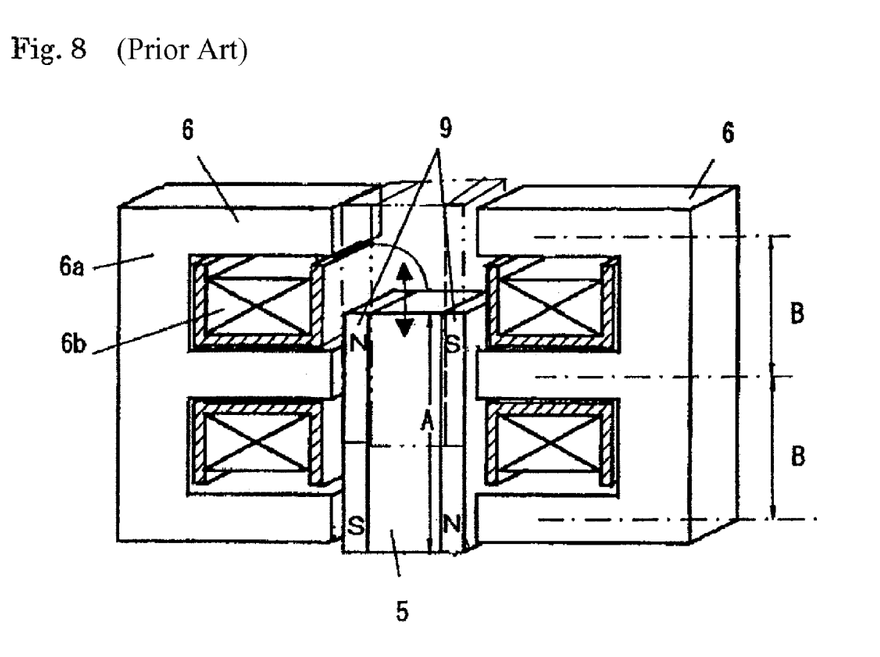
FIG. 8 shows a structure of a conventional electromagnetic linear actuator used in the remote operation device shown in FIGS. 6(a), 6(b), and 6(c)

FIG. 8 shows a structure of the electromagnetic linear actuator of a prior art. The moving part 5, which is guided and supported movably in the direction of the arrow, has permanent magnets 9 for field system on the left and right side surfaces opposing stationary parts 6. The stationary part 6 composes a coil section consisting of an E-shaped magnetic yoke 6a and an actuation coil 6b wound around the center leg of the yoke. The length A of the permanent magnet 9 (a distance between N and S poles) and the distance B between the center leg and an outer leg of the magnetic yoke 6a are set to satisfy the relation B<A<2B.

Figure 6:
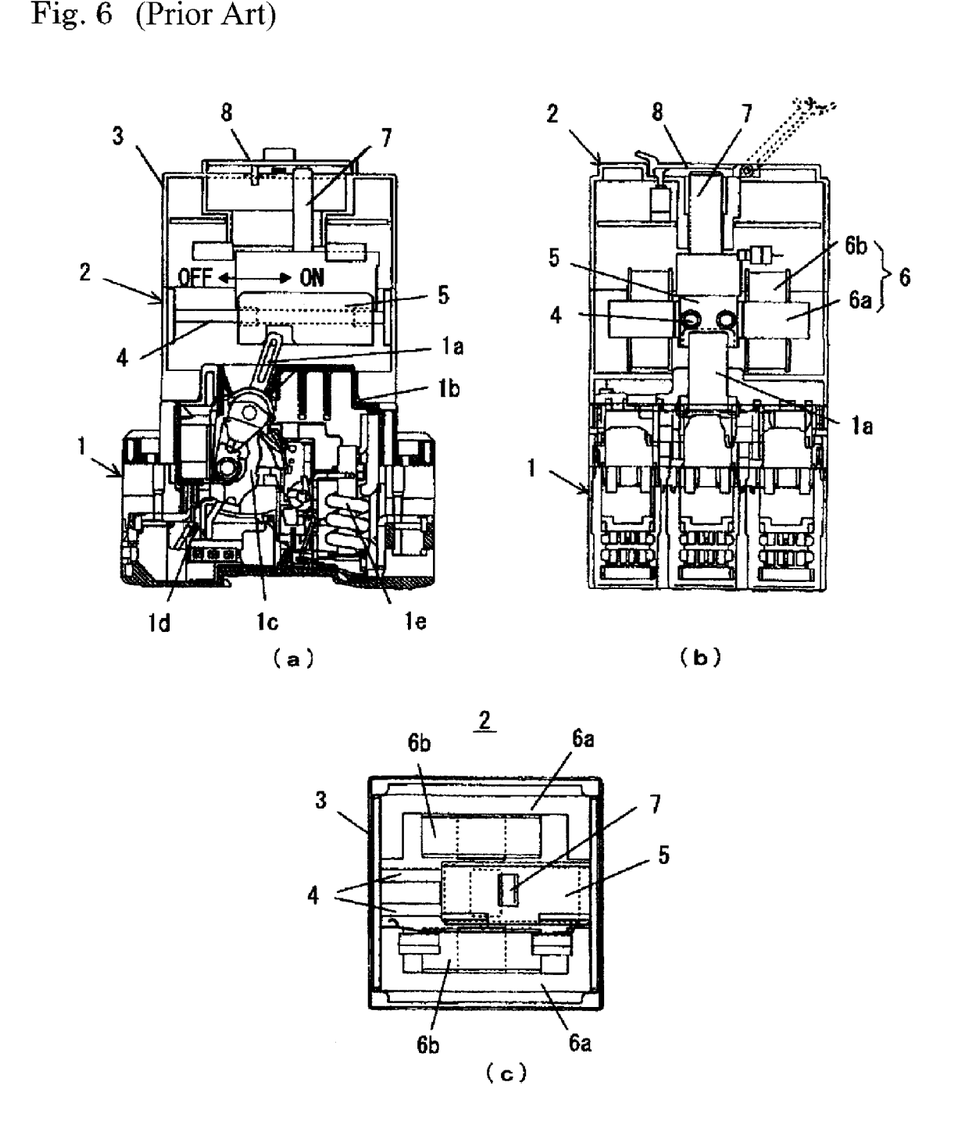
FIG. 6(a) is a side sectional view of a circuit breaker and a remote operation device mounted on the circuit breaker.
FIG. 6(b) is a front sectional view.
FIG. 6(c) is a plan view of the remote operation device.

In operation of the linear actuator of the above-described structure, when an operation command for ON or OFF is given from outside to the remote operation device 2 shown in FIG. 6, and an excitation current is fed to the actuation coil 6b of the linear actuator according to the command, a magnetic thrust is generated between the magnetic yoke 6a of the stationary part 6 and the permanent magnet 9 of the moving part 5 corresponding to the direction of the excitation current. The magnetic thrust moves the moving part 5 from one stroke end to the other stroke end along the guide rail 4, thereby changing over the rocker handle 1a of the circuit breaker 1 to ON or OFF position. A switch for detecting ON or OFF position is provided at the end position of moving path of the moving part 5. When the moving part 5 reaches the end position of ON or OFF in ON or OFF operation of the circuit breaker 1, the excitation of the actuation coil 6b is stopped according to the output signal from the switch for position detection. In the condition without excitation of the actuation coil 6b, the moving part 5 receives magnetic force from the permanent magnets 9 and attracted, and held at the end position corresponding to ON or OFF position.

Figure 9:
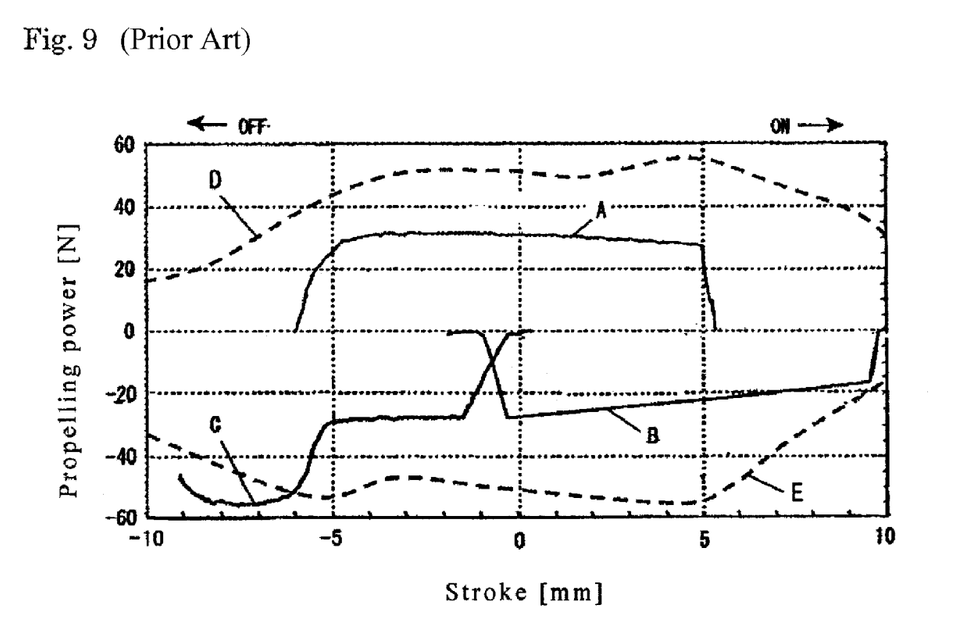
FIG. 9 shows characteristic curves of thrust forces by the electromagnetic linear actuator shown in FIG. 8 and the load of the circuit breaker.

FIG. 9 shows an example of characteristics of thrust and load when a remote operation device 2 having the above-described construction is mounted on a circuit breaker 1 (a low rating molded case circuit breaker) and the handle 1a is driven to ON, OFF, or RESET position by the linear actuator. In FIG. 9, the abscissa represents a stroke (mm) to ON and OFF directions relative to the center of the handle 1a and the ordinate represents a thrust (N) (in which + means a thrust in the ON direction and − means a thrust in the OFF direction). The characteristic curves A, B, and C represent the loads (primarily, a reaction force from the toggle spring provided in the switching mechanism) exerted on the linear actuator of the remote operation device 2 from the handle 1a of the circuit breaker 1 in the process of ON operation, OFF operation, and RESET operation, respectively, of the circuit breaker. The characteristic curves D and E represent electromagnetic thrust forces on the moving part 5 when excitation current (direct current) for ON and OFF directions, respectively, is fed to the actuation coil 6b (FIG. 8) of the linear actuator.

In these characteristic curves, the area enclosed by the abscissa of thrust=0 and each of the characteristic curves A through E represents a work done in each operation process. To change-over the operation handle of the circuit breaker between ON, OFF, and RESET positions, the electromagnetic thrust (characteristic curves D and E) must overcome the load of the operation handle (characteristic curves A, B, and C) during the change-over process. With regard to this point, in the process of changing-over the handle of the circuit breaker from ON to OFF, the load increases accompanying the handle motion (characteristic curve B), reaches a peak just after passing the point of stroke=0, and then abruptly drops because of reversal action of the switching mechanism. On the other hand, the electromagnetic thrust of the linear actuator (characteristic curve E), starting excitation of the actuation coil at ON position of the handle, increases gradually in the first half of the change-over process, accelerating the moving part 5 and putting an inertial force on the moving part. The moving part 5 goes over the peak point of the load (characteristic curve B) in the latter half of the charge-over process, and after that, rushes to the OFF end position to finish the OFF operation of the handle.

The process to change-over the handle of the circuit breaker from OFF to ON is approximately the same as the process from ON to OFF described above. In the latter half of the operation process, the load (characteristic curve A) abruptly drops on reversal action of the switching mechanism. The moving part of the linear actuator accelerates from the start of the process receiving the electromagnetic thrust (characteristic curve D), being added by an inertial force, rush to the ON end position to finish ON operation of the handle of the circuit breaker.

In a trip action of the circuit breaker (in which the actuation coils of the linear actuator are in a condition without excitation), the moving part 5 of the linear actuator coupled to the operation handle are attracted by the magnetic force of the permanent magnets 9 and held at the ON side. So, the handle 1a of the circuit breaker does not move to TRIP position like the case of single use of the breaker, but stays still at around the ON position. To reset the switching mechanism using the remote operation device after trip action of the circuit breaker, the handle is once again moved back to the ON end position by operating the linear actuator, and then moved anew from this ON position towards OFF position to make reset operation of the switching mechanism. In the process of this reset operation, the load (characteristic curve C) increases near the stroke end of OFF side to anchor the latch of the switching mechanism at a lock position. In this respect, the moving part, started at the ON position and traveled to the OFF end position, can overcome the load (characteristic curve C) with the aid of accompanied abundant inertial force and arrives at the RESET position.

A remote operation device that changes-over a handle of a circuit breaker using the linear actuator described above has the following problems in operation and functional performances. When an excitation current is fed to the actuation coils 6b, according to an operation command in a linear actuator having the conventional structure shown in FIG. 8, the moving part 5 moves at once from one end position to the other end position receiving the electromagnetic thrust. The moving part 5 is accelerated with the traveled distance, and with the aid of the inertial force, the moving velocity of the moving part 5 increases. On the other hand, the load of the handle (FIG. 9) abruptly falls down just before the end position as described previously. Consequently, the handle that reached the ON or OFF end position violently collides against the window frame formed on the cover 1b (FIG. 7) of the breaker case. The impulsive force might break the handle, which is made of a resin. To cope with this problem, a remote operation device has been provided with a dumping structure at the stroke end of the moving part, thereby absorbing the impulsive load of the handle and avoiding breakdown of the handle. This structure, however, results in increased complexity and higher cost of the device.

SUMMARY OF THE INVENTION

The present invention provides a linear actuator in which a steady electromagnetic thrust is assured. When the linear actuator is used in a remoter operation device, the whole process of changing-over operation of a handle of a circuit breaker and the handle does not need to take an unduly large impulsive load at the end position of the changing-over process, thereby exhibiting stable operation and functional performance.

A linear actuator in accordance with the invention includes a first permanent magnet type linear pulse motor including a first moving part and a first stationary part, a second permanent magnet type linear pulse motor, arranged opposite to the first permanent magnetic type linear pulse motor, including a second moving part and second stationary part, and an actuator member coupled to the first moving part and the second moving part. Each of the first permanent magnet type linear pulse motor and the second permanent magnetic type linear pulse motor include a field section including a plurality of permanent magnets arranged in a row such that neighboring magnets have reversed polarity, and a coil section having a three-leg type magnetic yoke and actuation coils wound around legs of the magnetic yoke. A length A of one permanent magnet and an inter-leg pitch B of the three-leg type magnetic yoke are set to satisfy the relation $(3/3 \times A) < B < (5/3 \times A)$ and, most preferably, $B = (4/3 \times A)$.

In one preferred embodiment of the invention, the first moving part includes the field section of the first permanent magnetic type linear pulse motor and the second moving part includes the field section of the second permanent magnetic type linear motor.

Alternatively, in another preferred embodiment of the invention, the first moving part includes the coil section of the first permanent magnetic type linear pulse motor and the second moving part includes the coil section of the second permanent magnetic type linear motor.

The actuator member may include an actuator opening through which a member (for example a rocker type switch of a circuit breaker) upon which the actuator member is to apply a force passes. Alternatively, the actuator member itself may include a manual handle.

A controller is provided to drive the coil section of the first permanent magnetic type linear motor and the coil section of the second permanent magnetic type linear motor. The controller controls an electric current in the actuation coils to sequentially change-over excitation patterns impressed on the actuation coils wound around the legs of the magnetic yoke from one step to a next step.

The above-described linear actuator can be incorporated into a remote operation device that is attached to a circuit breaker having a rocker type handle, wherein the linear actuator is coupled to the rocker type handle and operates the handle to the ON, OFF and RESET positions.

The current in the actuation coils is controlled by the controller to sequentially change excitation patterns for the actuation coils from one step to the next step The excitation patterns determine selection of the actuation coils to which excitation current is to be fed and direction of the excitation current. The movement of the moving part stabilizes in each step receiving the load of the handle and the kinetic frictional drag on the moving part, and proceeds to the next step. Therefore, there is no possibility for the moving part of the actuator to be accelerated continuously throughout the whole operation process. Even when the handle arrives at the end position of the change-over operation, the handle does not receive a large inertial force from the moving part. Moreover, because the excitation pattern on the actuation coils is sequentially changed from a step to the next step, the thrust on the moving part is relatively uniform and in a high level throughout the whole operation process.

Therefore, the handle stops at the end position of the change-over operation without receiving an unduly large impulsive force, eliminating the problem of breakdown of the handle in the conventional devices. Thus, a change-over operation of a handle can be performed safely and smoothly. The remote operation device does not need to be provided with a damping structure, simplifying the structure and reducing product cost.

One of the field section and the coil section of the linear pulse motor composes a stationary part, and the other composes a moving part, the moving part of the two linear pulse motors arranged in a lateral symmetry are linked to the handle of the circuit breaker. Therefore, in addition to obtaining a thrust force by the linear pulse motors to drive the handle, the attractive forces each acting between the moving part and the stationary part on one linear pulse motor and in the direction perpendicular to the thrust force, are cancelled.

BRIEF DESCRIPTION OF THE DRAWINGS

The invention will be described with reference to certain preferred embodiments and the accompanying drawings, wherein:

FIGS. 1(a) and 1(b) show a structure of a remote operation device of Example 1 of an embodiment according to the invention, in which

FIGS. 2(a) and 2(b) show a structure of a remote operation device of Example 2 of an embodiment according to the invention, in which

FIGS. 3(a), 3(b), and 3(c) show excitation patterns impressed on a coil section of the linear pulse motor in the process of ON operation of the handle of the circuit breaker in the construction of FIGS. 1(a) and 1(b), in which

FIGS. 6(a), 6(b), and 6(c) show a structure of a remote operation device of a prior art, in which

FIG. 10(a) corresponds to the pattern #1, FIG. 10(b) to #2, FIG. 10(c) to #3, FIG. 10(d) to #4, FIG. 10(e) to #5, and FIG. 10(f) to #6.

DETAILED DESCRIPTION OF THE PREFERRED EMBODIMENTS OF THE INVENTION

FIGS. 1(a) and 1(b) show a structure of a remote operation device of the first embodiment of the invention in which FIG. 1(a) is an external perspective view of a circuit breaker and a remote operation device mounted on the circuit breaker, and FIG. 1(b) shows a schematic construction of a permanent magnet type linear pulse motor composing the remote operation device. The remote operation device 2 of this embodiment example is provided with two permanent magnet type linear pulse motors 10 arranged left and right. The remote operation device 2 is mounted on the top of a case of the circuit breaker 1. Stationary parts 11 of the linear pulse motors 10 are fixed on the case of the breaker and moving part 12 are linked to a handle 1a of the circuit breaker.

The permanent magnet type linear pulse motor 10 comprises a field section 15 including a base 13 with a strip configuration and a plurality of permanent magnets 14 arranged in a row on the base 13 and a coil section 18 including a three-leg type magnetic yoke 16 and actuation coils 17a (coil 1), 17b (coil 2), and 17c (coil 3) wound around legs 16a, 16b, and 16c of the magnetic yoke 16. The permanent magnet 14 is a magnet with a rectangular plate shape magnetized in a thickness direction. The permanent magnets are so arranged that neighboring magnets have reversed polarity of N pole or S pole. The row of the permanent magnets 14 opposes the coil section 18 with a gap therebetween.

Figure 4:
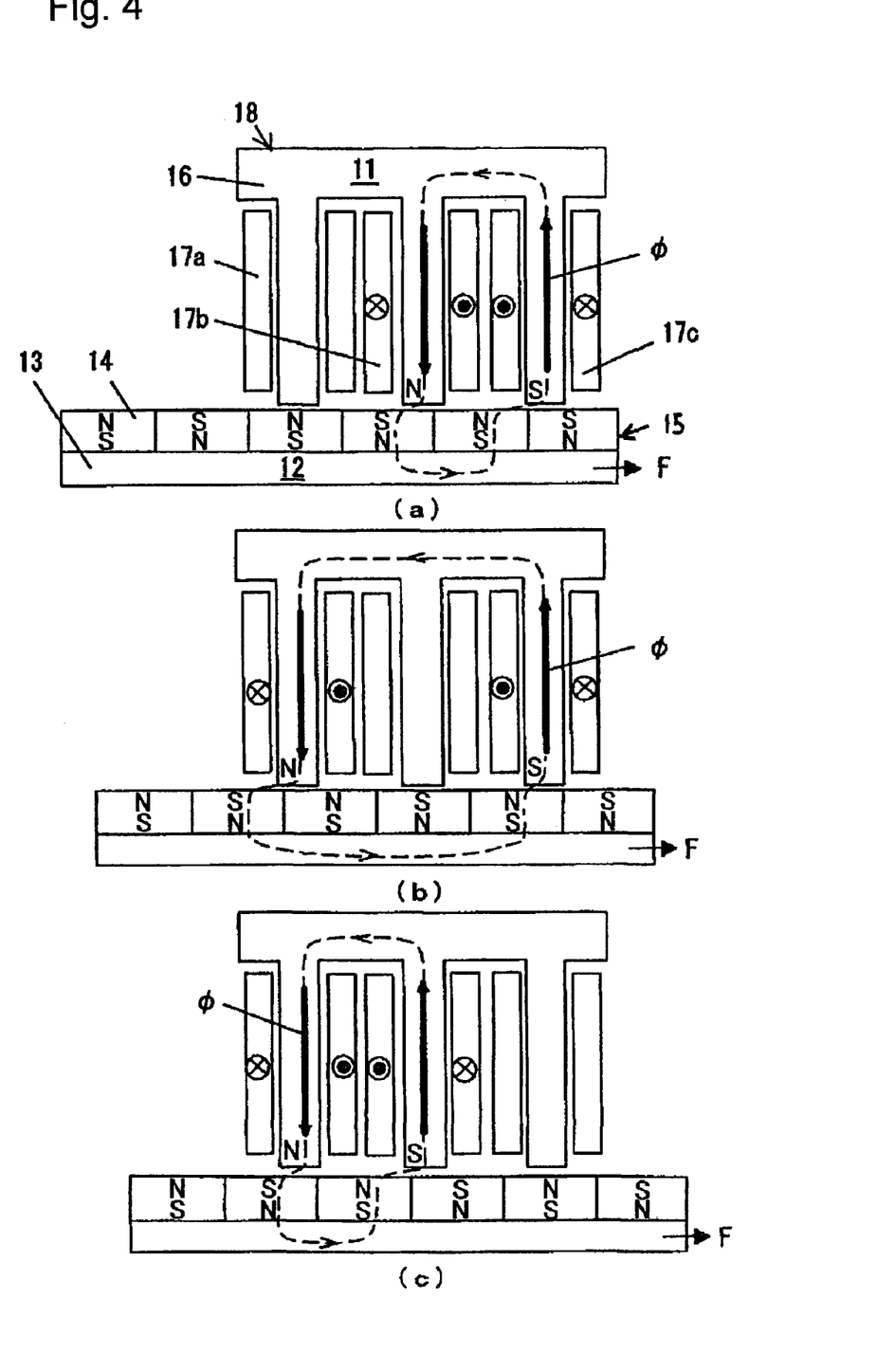
FIGS. 4(a), 4(b), and 4(c), corresponding to the excitation patterns in FIGS. 3(a), 3(b), and 3(c), show the direction of excitation current in the actuation coils and the pathway of magnetic flux through the coil section and the field section.
Figure 5:
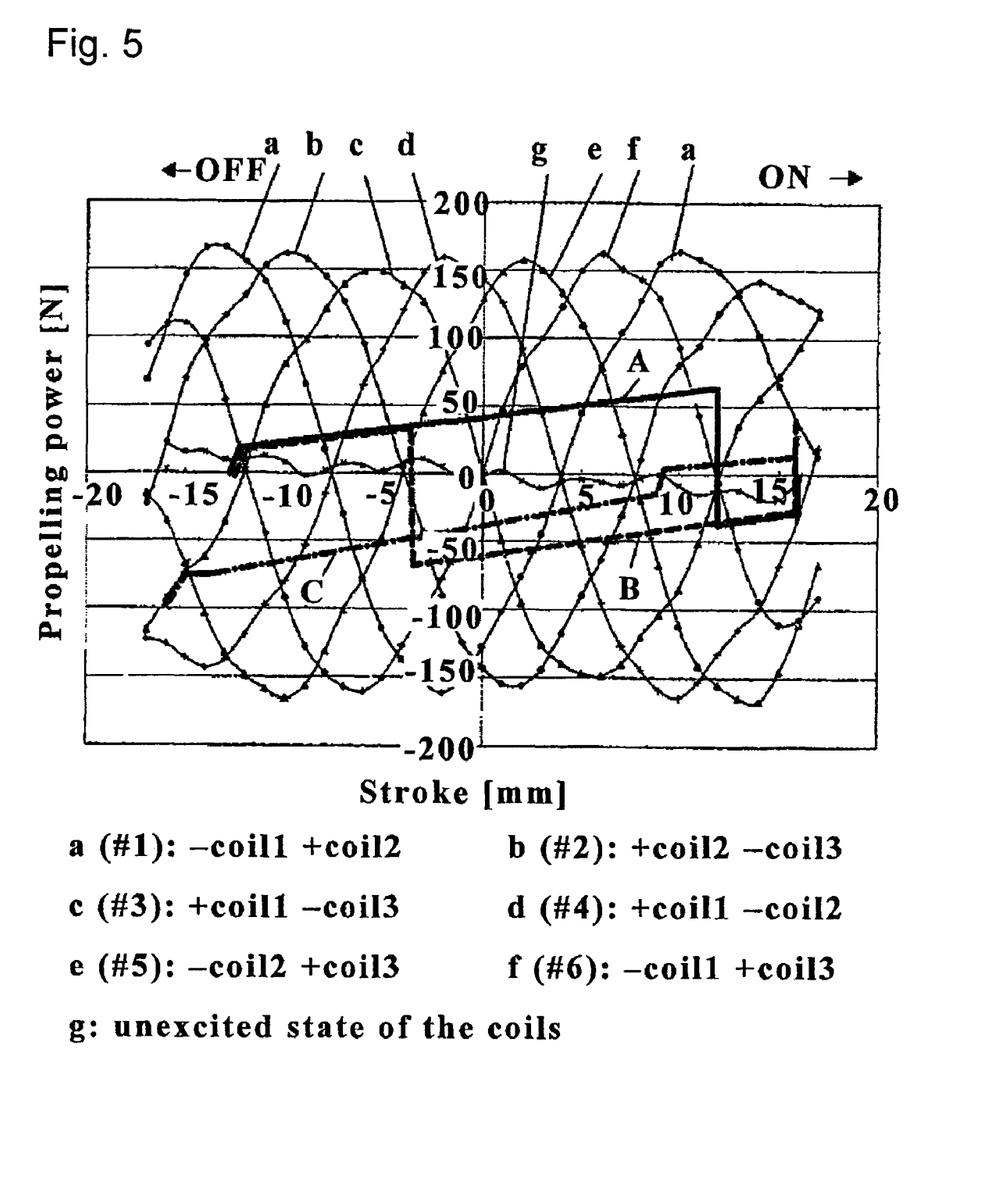
FIG. 5 shows characteristic curves of electromagnetic thrust corresponding to the excitation patterns of FIGS. 3(a), 3(b), 3(c), and the load of the handle of a circuit breaker.
Figure 11:
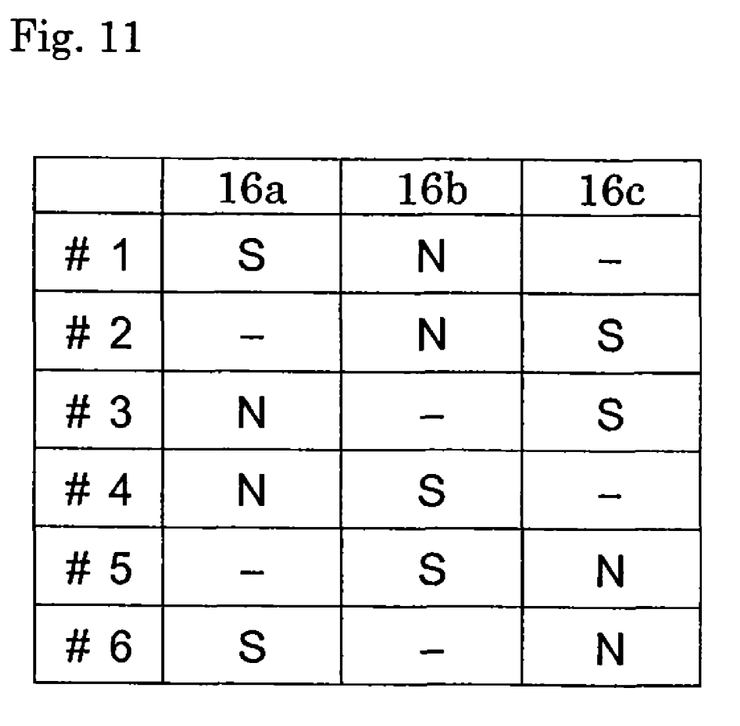
FIG. 11 is a table illustrating excitation patterns of the invention.

In the three-leg type magnetic yoke 16 device of the invention, in order to form a loop of magnetic flux passing through the magnetic yoke 16 as shown in FIG. 4(a), 4(b), and 4(c), either pair of legs selected from the legs 16a, 16b, and 16c must be made N pole and S pole. There are six possible combinations to attribute two legs out of the legs 16a, 16b, and 16c to N pole and S pole. Table 1 illustrated in FIG. 11 shows an excitation pattern of the legs 16a, 16b, and 16c of the three-leg type magnetic yoke 16. These patterns are produced by supplying electric current to the actuation coils 17a (coil 1), 17b (coil 2), and 17c (coil c) in the current supplying patterns #1 through #6 shown in FIG. 3. There are just six current supplying patterns #1 through #6 in FIG. 3; the pattern #7 is identical to the pattern #1. In Table 1, the patterns #4, #5, and #6 are similar to the patterns #1, #2, and #3 but have reversed polarities of magnetic poles. Specifically, the pattern #4 is a reversed polarity excitation pattern of the pattern #1, the pattern #5 is reversed pattern of the pattern #2, and the pattern #6 is reversed pattern of the pattern #3. FIG. 5 shows characteristic curves of the thrust force for each current supply pattern. The patterns #1 through #6 in Table 1 and FIG. 3 corresponds to the patterns "a" through "f" in FIG. 5, respectively. The characteristic curves of thrust force in FIG. 5 exhibit symmetrically reversed relationship between a-d, b-e, and c-f like the excitation patterns in Table 1.

In order to sequentially perform relative movement between the three-leg type magnetic yoke 16 in the coil section and the permanent magnets 14 in the field section, it is necessary in the successive excitation patterns to reverse the polarity of one of the legs 16a, 16b, and 16c, or to excite a leg that is not excited in the previous pattern. Besides, the polarity of a permanent magnet 14 opposing the leg in a certain polarity (not a neutral polarity) must be in a reversed polarity against the polarity of the leg.

Further, in the process from the pattern #1 to the pattern #4, the three-leg type magnetic yoke 16 moves a distance A, a length of a permanent magnet 14, relative to the permanent magnet 14; in the process from a certain pattern to the subsequent pattern, the three-leg type magnetic yoke 16 moves a distance A/3 relative to the permanent magnet 14.

Figure 10:
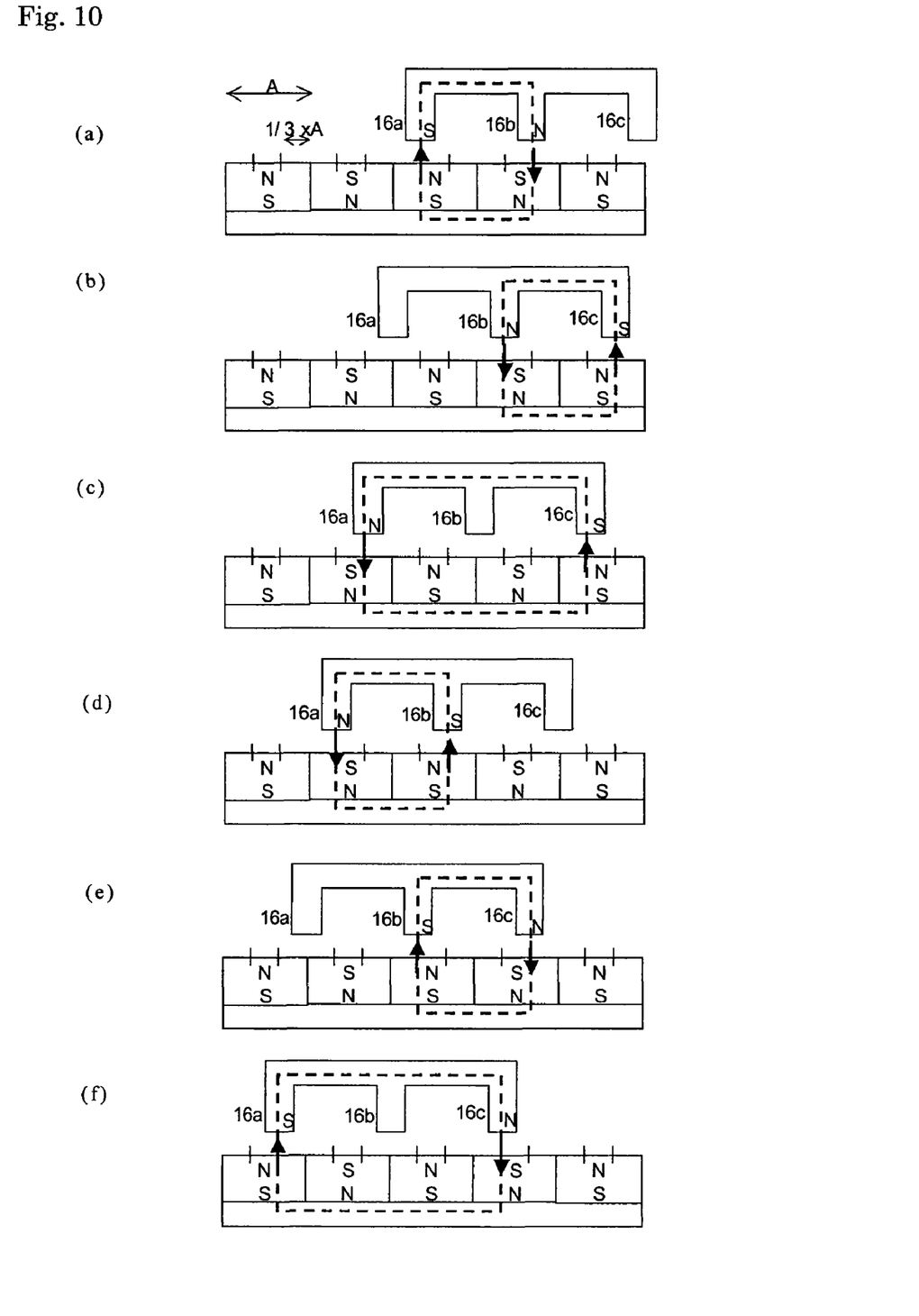
FIGS. 10(a) through 10(f) show relative positions between the coil section 18 and the field section 15 in the sequential current supplying patterns.

FIGS. 10(a) through 10(f) show relative positions between the coil section 18 and the field section 15 in the sequential current supplying patterns. FIG. 10(a) corresponds to the pattern #1, FIG. 10(b) to #2, FIG. 10(c) to #3, FIG. 10(d) to #4, FIG. 10(e) to #5, and FIG. 10(f) to #6.

To obtain a thrust force in a regular manner, it is preferable to proceed by just ⅓ of A, the length of a permanent magnet 14, in every step of three steps of excitation patterns from #1 to #4. A balanced thrust characteristic among strokes as shown in FIG. 5 can be ensured by a movement in a subsequent step of excitation pattern by a distance of ⅓ of the length A of a permanent magnet. The excitation of #2 and #3 are conducted between the excitation #1 and #4 with a regular interval so that a thrust force is generated in a regular manner at the stroke positions as shown in FIG. 5.

For the movement by ⅓ of the length A of the permanent magnet 14 in every successive step of excitation patterns, the magnetic poles of the legs 16a, 16b, 16c and the opposing permanent magnets 14 must be in a balance in every excitation pattern in Table 1 and in a dimensional relationship that can hold a magnetically stable condition. (See FIG. 10.) The allowable range of the value B, the inter-leg pitch, for that condition is from 3/3×A to 5/3×A, and the most preferable B value is 4/3×A.

Figure 1:
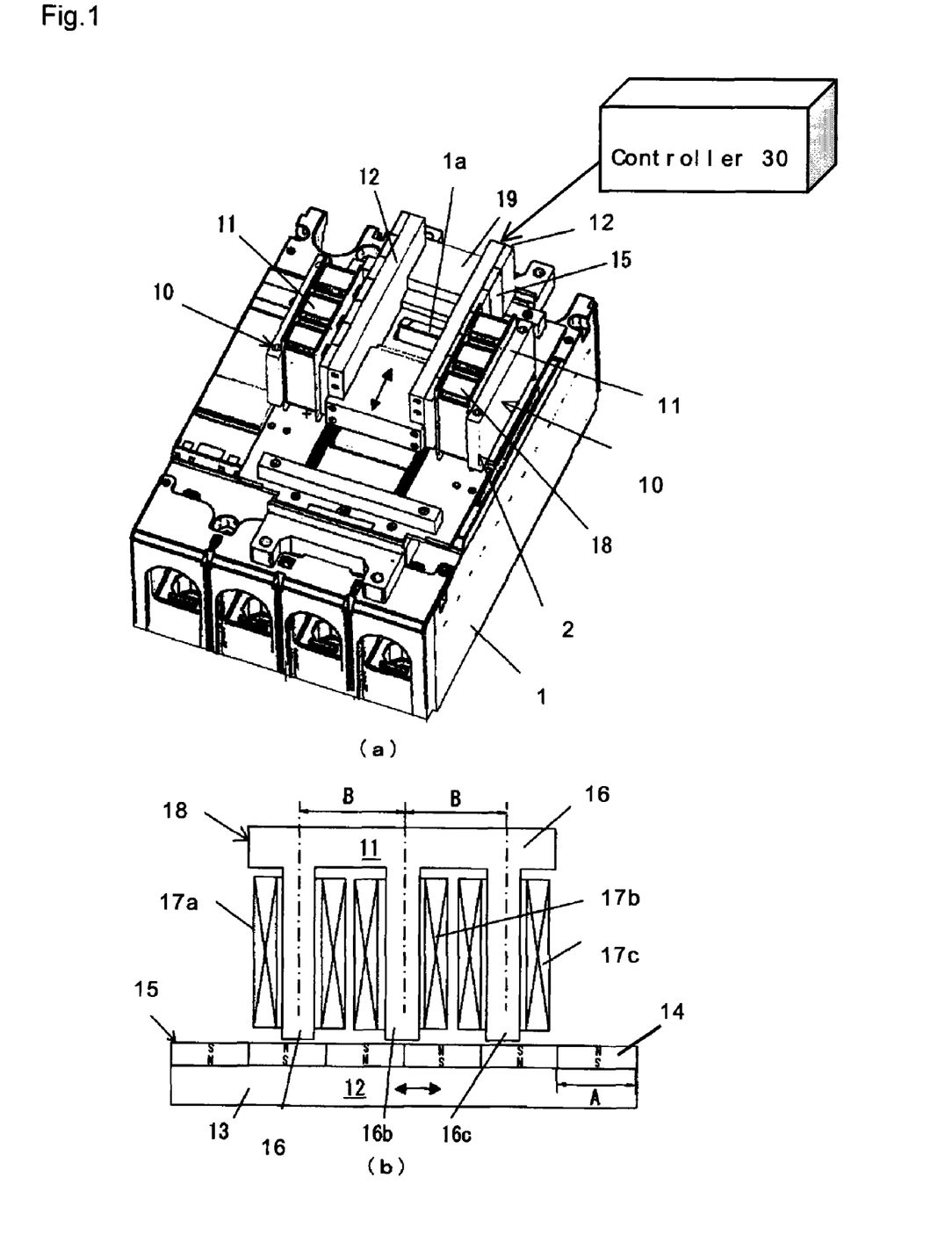
FIG. 1(a) is an external perspective view of the remote operation device mounted on a circuit breaker.
FIG. 1(b) shows a schematic construction of a linear pulse motor in FIG. 1(a)

In the embodiment of FIG. 1, the coil section 18 constitutes a stationary part 11 and the field section 15 constitutes a moving part 12 (actuator member). The two sets of linear pulse motors 10 arranged left and right are disposed with the field section 15 inside and the coil section 18 outside. The two sets of field sections 15 are disposed back-to-back and combined with left and right sides of a movable frame 19 (which, being attached to the field section 15, also constitutes part of the moving part), as shown in FIG. 1(a). The movable frame 19 is guided and supported by a guide rail (not shown in FIG. 1(a) but equivalent to the guide rail 4 in FIG. 6) and engages to the handle 1a projecting out of the case top of the circuit breaker 1. The coil sections 18 are disposed in a case (not shown in FIG. 1(a) but equivalent to the case 3 in FIG. 6), which in turn is screwed to a predetermined place of the top surface of a case of the circuit breaker 1.

In ON, OFF, and RESET operation on the handle 1a after mounting the remote operation device 2 having the above-described structure on the circuit breaker 1, an external operation command is given to the remote operation device 2 via a control line (not shown) in a conventional manner. According to this operation command, excitation current is fed to the actuation coils 17a, 17b, and 17c wound in the coil section 18 of the linear pulse motor 10 by feeder lines (not shown). The excitation current in the feeder lines is controlled by an external controller 30 (for example, a general purpose computer programmed to perform the control operation, application specific controller, microprocessor, etc.) to have excitation patterns as described hereinafter, and generates an electromagnetic thrust force between the coil section 18 and the field section 15. The electromagnetic thrust force causes a stepwise motion of the moving part 12 linked to the handle 1a of the circuit breaker 1 via the moveable frame and drives the handle 1a towards an end position of the change-over operation.

Next, a detailed description will be made on control for feeding current and moving operation in the remote operation device 2 in an example of the case in which the handle 1a of the circuit breaker 1 is operated from OFF position to ON position. An excitation scheme for the actuation coils of the coil section 18 is given by the time charts of FIGS. 3(a), 3(b), and 3(c). FIGS. 3(a), 3(b), and 3(c) show time charts of excitation voltages impressed on coil 1 (actuation coil 17a), coil 2 (actuation coil 17b), and coil 3 (actuation coil 17c) in the process of changing-over operation. FIGS. 4(a), 4(b), and 4(c) show the directions of excitation current fed in the actuation coils corresponding to the excitation patterns of FIGS. 3(a), 3(b), 3(c), and the pathways of magnetic flux through the permanent magnets 14 of the field section 15 and the magnetic yoke 16 of the coil section 18.

In the case of operating the handle 1a of the circuit breaker 1 from OFF position to ON position, the excitation pattern is divided into #1 through #7 steps (each step has a duration of 100 ms) adapting to the movement in the operation process. In each step, a positive or negative voltage is applied to two actuation coils selected from the three actuation coils (coil 1, coil 2, and coil 3) as shown in FIGS. 3(a), 3(b), and 3(c) to feed excitation current. FIG. 4(a) shows a state (of step #2 in FIGS. 3(a), 3(b), 3(c)) in which coil 1 is not excited, coil 2 is impressed with a positive voltage, and coil 3 is impressed with a negative voltage. The thick arrows in FIG. 4(a) (and FIGS. 4(b) and 4(c)) designate the direction of magnetic flux generated in the magnetic yoke by the magnetomotive force of the excitation current. FIG. 4(b) shows a state corresponding to the excitation pattern (of step #3 in FIGS. 3(a), 3(b), 3(c)) in which coil 1 is impressed with a positive voltage, coil 2 is not excited, and coil 3 is impressed with a negative voltage. FIG. 4(c) shows a state corresponding to the excitation pattern (of step #4 in FIGS. 3(a), 3(b), 3(c)) in which coil 1 is impressed with a positive voltage, coil 2 is impressed by a negative voltage, and coil 3 is not excited.

FIG. 5 shows the characteristics of thrust force by the linear pulse motor corresponding to the excitation patterns described above and the characteristics of thrust force representing the load exerted by the handle 1a on the remote operation device 2 in the processes of ON, OFF, and RESET operations of the circuit breaker. In FIG. 5, like in FIG. 9, the abscissa represents a stroke (mm) along ON or OFF direction of the handle, and the ordinate represents thrust force (N). The characteristic curves A, B, and C represent the load in the process of ON, OFF, and RESET operations, respectively. (Positive values indicate the load in ON direction and negative values indicate the load in OFF direction.) The characteristic curves "a" through "f" represent the thrust forces corresponding to the excitation patterns "a" through "f", respectively, of the insertion in FIG. 5. (Positive values indicate the thrust in ON direction and negative values indicate the thrust in OFF direction.)

The characteristic curve "g" represents an attractive thrust force acting between the permanent magnets 14 of the field section 15 and the magnetic yoke 16 of the coil section 18 in an unexcited state of the actuation coils.

Next, the action of the linear pulse motor 10 is described below. In the situation of relative positions between the magnetic yoke 16 of the coil section 18 (the stationary part 11) and the permanent magnets 14 of the field section 15 (a moving part 12) as shown in FIGS. 4(a), 4(b), and 4(c), the excitation patterns for the actuation coils generate the flow of magnetic flux $\phi$ in the pathway through the legs of the magnetic yoke 16 and the permanent magnets 14 as shown in FIGS. 4(a), 4(b), and 4(c). The magnetic flux generates a magnetic thrust force (magnetic attractive force) including a component in the direction of movement of the moving part 12, between the field section 15 and the coil section 18. The thrust drives the moving part 12 in the direction indicated by the arrow F. When the relative position of the coil section 18 and the field section 15 is slightly displaced to the right, the magnetic flux distribution changes to decrease the thrust in the direction of arrow F. Additional forces of the load of the handle 1a and the kinetic frictional drag on the moving part 12 stabilize the movement of the moving part 12 to slow down the moving part.

By controlling (open loop control) the current in the actuation coils sequentially changing the excitation pattern along the steps shown in FIGS. 3(a), 3(b), and 3(c), the moving part 12 move in a stepwise motion in the operation process as shown in FIG. 4(a)→FIG. 4(b)→FIG. 4(c). The stepwise motion produced by these excitation patterns is represented in terms of the characteristic curves of the thrust shown in FIG. 5; the thrust force acting on the moving part in the process of operation changes over in the sequence of characteristic curves a→b→c→d→e→f. (The excitation pattern is changed over so that each characteristic curve transfers to the next characteristic curve at the cross point of the two characteristic curves.) Therefore, a relatively steady and large thrust force is gained in the whole process of the ON operation. Moreover, when the moving part passes the peak point of the load in the latter half of the operation process and move to the end position, the movement of the moving part stabilizes and the thrust (characteristic curve "a") to drive the handle decreases to nearly zero (N).

The driving action of the moving part as described above does not bring about the phenomena in the conventional devices in which a moving part was accelerated, thereby increasing the moving velocity during the process of the ON operation of a handle, and causing the handle to violently collided against a breaker case at the ON end position. Thus, in present invention, a change-over operation of a handle is carried out safely from an OFF position to ON position, while ensuring enough electromagnetic thrust force to overcome the load exerted on the remote operation device from the circuit breaker during the process of the ON operation. Since two sets of linear pulse motors 10 are arranged in a laterally symmetric configuration and linked to the handle 1a, cancellation of magnetic attractive forces is established that act in the direction perpendicular to the thrust force (thus, the perpendicular attractive forces do not contribute to thrust) between the stationary part 11 and the moving part 12. Thus, the useless friction, which might act on the guide mechanism, is kept at a minimum. Moreover, a damping structure, which was required in conventional devices to slow down the moving part and absorb shock at the end of a stroke, is eliminated thereby simplifying the structure of the device.

In the case of OFF operation and RESET operation of a circuit breaker, as in the ON operation described above, the current in the actuation coils are controlled sequentially changing the excitation pattern in steps. The moving part are moved in the stepwise motion from ON position to OFF position or RESET position, and a change-over operation of a handle is carried out safely.

While the embodiment example described above employs an open loop control in which the excitation patterns are changed over at a predetermined time, a closed loop control can also be employed in which position sensors are provided corresponding to the arrangement of the permanent magnets and the position signal for the moving part detected by the sensors is used for changing over the excitation patterns.

Figure 2:
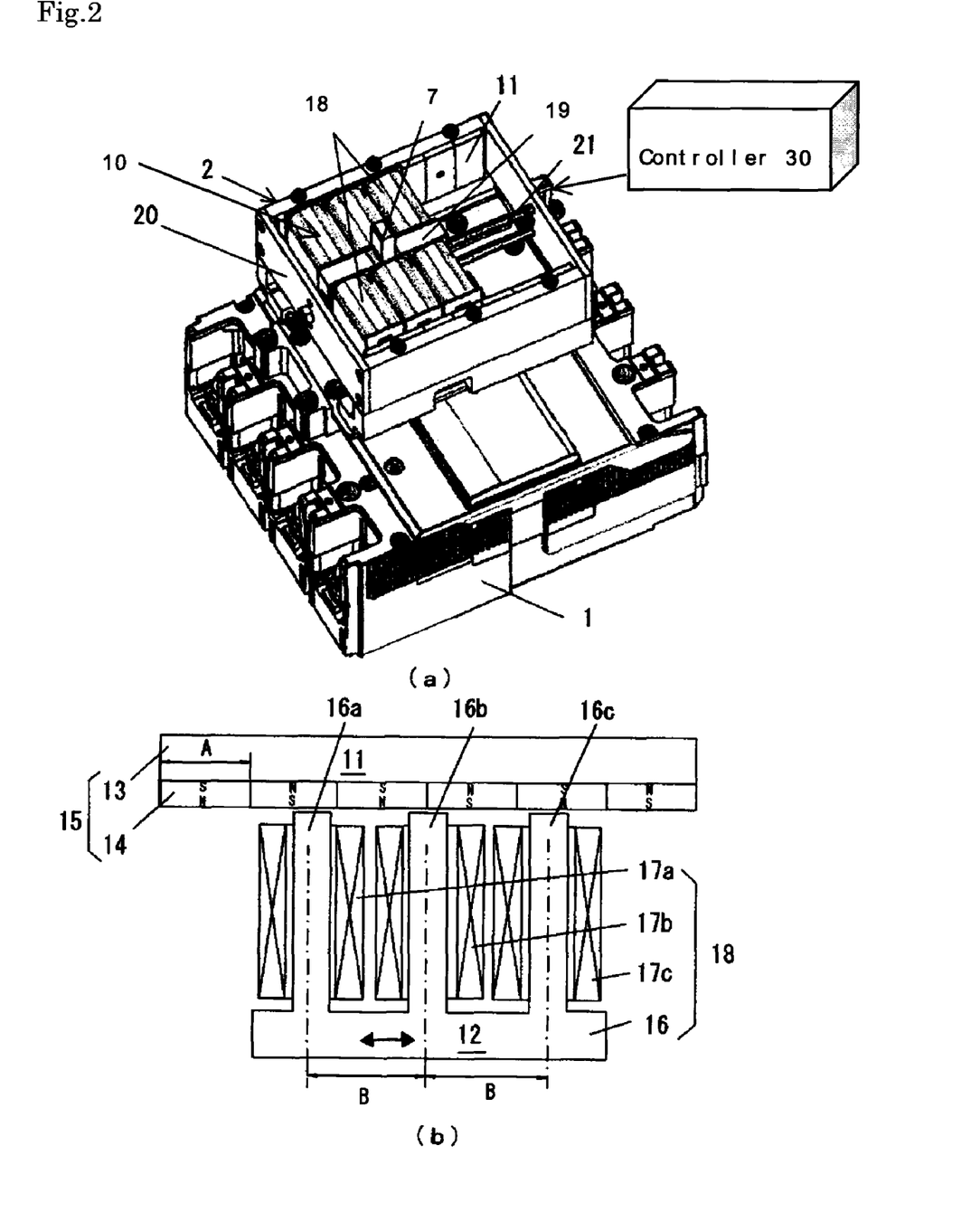
FIG. 2(a) is an external perspective view of the remote operation device mounted on a circuit breaker.
FIG. 2(b) shows a schematic construction of a linear pulse motor in FIG. 2(a)
Figure 3:
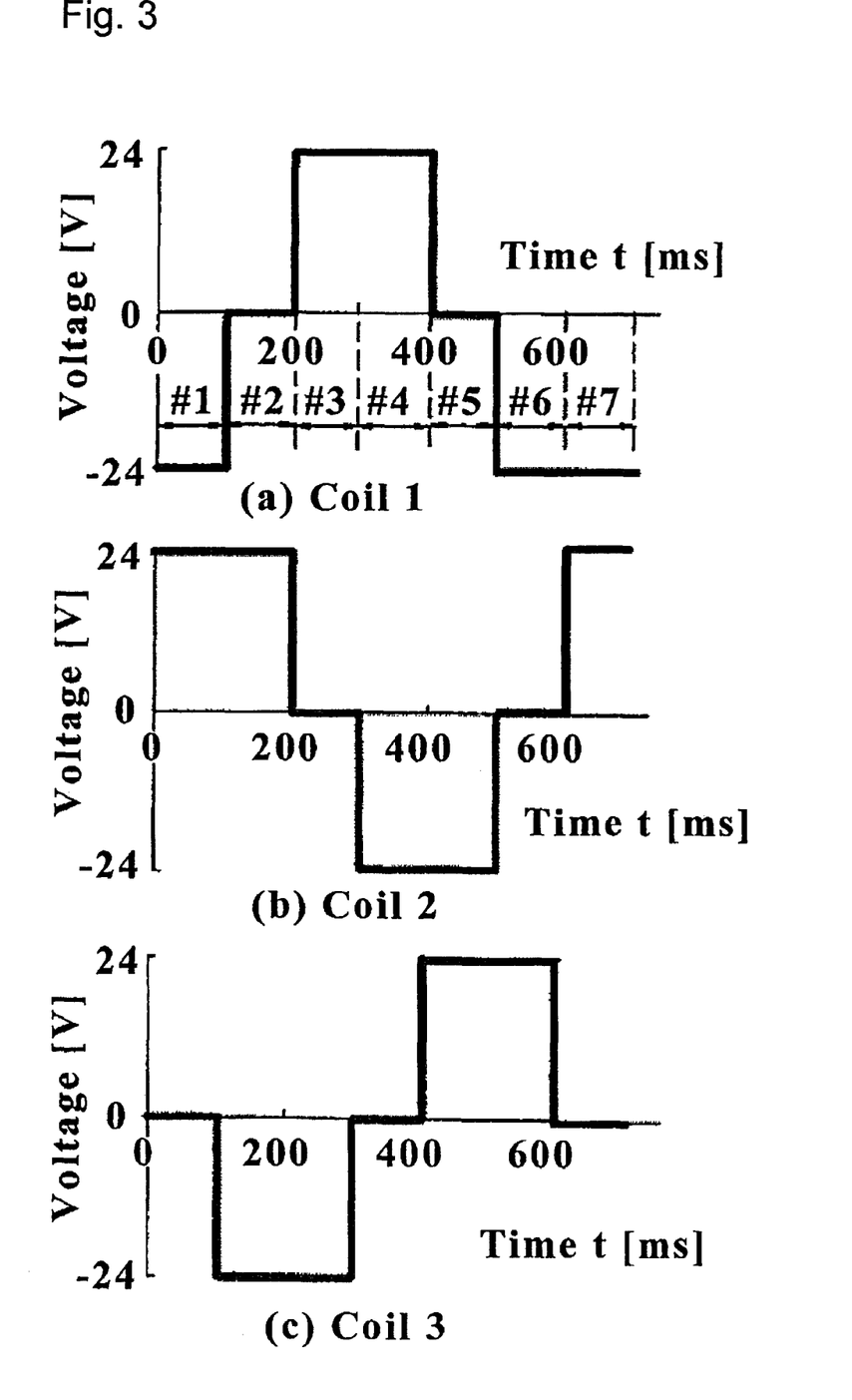
FIGS. 3(a), 3(b), and 3(c) are time charts for coil 1, coil, 2, and coil 3, respectively, of the coil section.

FIGS. 2(a) and 2(b) show a second embodiment of a remote operation device in which a field section of a linear pulse motor constitute a stationary part and a coil section constitute a moving part. Two linear pulse motors 10 are aligned in the left and right and mounted on a top of the case of a circuit breaker 1. Coil sections 18 and field sections 15 of the linear pulse motors are arranged back-to-back with the coil sections 18 inside and the field sections 15 outside, opposite to arrangement in the first embodiment. The field sections 15 (stationary parts 11 in this embodiment) are disposed along left and right side walls and inside the side walls of the case 20 of the remote operation device 2. The coil sections 18 (moving part 12 in this embodiment) are guided and supported by one or more guide rails 21 and linked to a manual handle 7 in an arrangement similar to that shown in FIG. 6. Accordingly, the manual handle 7 also constitutes part of the moving part 12 (which constitutes an actuator member) as it is attached to the coil sections 18. In this construction, the coil sections 18 are driven in the operation process as in the first embodiment and the remote operation device 2 of Example 2 can safely carry out ON, OFF, and RESET operation on the handle 1a of the circuit breaker 1.

Comparing the relative merits between the two embodiments, although electromagnetic thrust obtained during the handle operation process is not different, coil sections 18 constitute stationary parts 11 in the first embodiment, so the feeder lines for exciting the actuation coils can be laid out in a fixed manner to simplify the wiring. Further, the permanent magnets 14 must be arranged over whole moving stroke of the handle 1a in the second embodiment which requires a long field section 15.

The invention has been described with reference to certain preferred embodiments thereof. It will be understood, however, that modifications and variations are possible within the scope of the appended claims. For example, the first embodiment illustrated in FIG. 1 has the coil sections 18 as stationary elements and the field plates 15 as the moving part that is attached to the frame 19, but it will be understood that the arrangement could be reversed (similar to the second embodiment) such that the coil elements 18 constitute the moving part coupled to the frame 19 and the field plates 15 are the stationary part. Similarly, the arrangement of the field plates 15 and the coil elements 18 could be reversed in the embodiment shown in FIG. 2 such that the field plates 15 are coupled to the manual switch 7 and the coil elements 18 are stationary. Still further modifications and variations are possible.

What is claimed is:

1. An apparatus comprising:
   a first permanent magnet type linear pulse motor including a first moving part and a first stationary part;
   a second permanent magnet type linear pulse motor, arranged opposite to the first permanent magnet type linear pulse motor, including a second moving part and second stationary part; and
   an actuator member coupled to the first moving part and the second moving part;

wherein each of the first permanent magnet type linear pulse motor and the second permanent magnetic type linear pulse motor include a field section including a plurality of permanent magnets arranged in a row such that neighboring magnets have reversed polarity, and a coil section having a three-leg type magnetic yoke and actuation coils wound around legs of the magnetic yoke; and wherein a length A of one permanent magnet and an inter-leg pitch B of the three-leg type magnetic yoke are set to satisfy the relation $(3/3 \times A) \leqq B \leqq (5/3 \times A)$.

2. An apparatus as claimed in claim 1, wherein $B = (4/3 \times A)$.

3. An apparatus as claimed in claim 1, wherein the first moving part comprises the field section of the first permanent magnetic type linear pulse motor and the second moving part comprises the field section of the second permanent magnetic type linear pulse motor.

4. An apparatus as claimed in claim 1, wherein the first moving part comprises the coil section of the first permanent magnetic type linear pulse motor and the second moving part comprises the coil section of the second permanent magnetic type linear pulse motor.

5. An apparatus as claimed in claim 1, wherein the actuator member includes an actuator opening.

6. An apparatus as claimed in claim 1, wherein the actuator member includes a manual handle.

7. An apparatus as claimed in claim 1, further comprising control means for driving the coil section of the first permanent magnetic type linear pulse motor and the coil section of the second permanent magnetic type linear pulse motor.

8. An apparatus as claimed in claim 7, wherein the control means controls an electric current in the actuation coils to sequentially change-over excitation patterns impressed on the actuation coils wound around the legs of the magnetic yoke from one step to a next step.

9. An apparatus comprising:
a circuit breaker including a rocker type handle; and
a linear actuator coupled to the rocker type handle;
wherein said linear actuator includes a first permanent magnet type linear pulse motor including a first moving part and a first stationary part, a second permanent magnet type linear pulse motor, arranged opposite to the first permanent magnet type linear pulse motor, including a second moving part and second stationary part, and an actuator member coupled to the first moving part and the second moving part and in contact with the rocker type handle;

wherein each of the first permanent magnet type linear pulse motor and the second permanent magnetic type linear pulse motor include a field section including a plurality of permanent magnets arranged in a row such that neighboring magnets have reversed polarity, and a coil section having a three-leg type magnetic yoke and actuation coils wound around legs of the magnetic yoke; and wherein a length A of one permanent magnet and an inter-leg pitch B of the three-leg type magnetic yoke are set to satisfy the relation $(3/3 \times A) \leqq B \leqq (5/3 \times A)$.

10. An apparatus as claimed in claim 9, wherein $B = (4/3 \times A)$.

11. An apparatus as claimed in claim 9, wherein the first moving part comprises the field section of the first permanent magnetic type linear pulse motor and the second moving part comprises the field section of the second permanent magnetic type linear pulse motor.

12. An apparatus as claimed in claim 9, wherein the first moving part comprises the coil section of the first permanent magnetic type linear pulse motor and the second moving part comprises the coil section of the second permanent magnetic type linear pulse motor.

13. An apparatus as claimed in claim 9, wherein the actuator member includes an actuator opening through which the rocker type handle passes.

14. An apparatus as claimed in claim 9, wherein the actuator member includes a manual handle.

15. An apparatus as claimed in claim 9, further comprising control means for driving the coil section of the first permanent magnetic type linear pulse motor and the coil section of the second permanent magnetic type linear pulse motor.

16. An apparatus as claimed in claim 15, wherein the control means controls an electric current in the actuation coils to sequentially change-over excitation patterns impressed on the actuation coils wound around the legs of the magnetic yoke from one step to a next step.

* * * * *